United States Patent [19]

Kashiwabara et al.

[11] 3,993,562
[45] Nov. 23, 1976

[54] LOOP-STYLE CONTINUOUS ION EXCHANGE UNIT

[75] Inventors: Masazumi Kashiwabara; Wataru Iida; Hisashi Akatsuka, all of Himeji, Japan

[73] Assignee: Idemitsu Kosan Co., Ltd., Tokyo, Japan

[22] Filed: Feb. 18, 1975

[21] Appl. No.: 550,711

[30] Foreign Application Priority Data

Feb. 21, 1974 Japan.............................. 49-20108

[52] U.S. Cl............................ 210/189; 23/270 R
[51] Int. Cl.²......................................... B01D 33/30
[58] Field of Search............ 23/270 R; 210/33, 189; 210/268, 275

[56] References Cited
UNITED STATES PATENTS

| 3,194,663 | 7/1965 | Higgins............................... | 210/189 |
| 3,468,707 | 9/1969 | Higgins............................... | 210/33 |
| 3,580,842 | 5/1971 | Higgins............................... | 210/33 |
| 3,677,937 | 7/1972 | Higgins et al...................... | 210/189 |

FOREIGN PATENTS OR APPLICATIONS

| 1,581,861 | 9/1969 | France |
| 1,816,658 | 7/1970 | Germany |

*Primary Examiner*—Thomas G. Wyse
*Assistant Examiner*—Ivars Cintins
*Attorney, Agent, or Firm*—Flynn & Frishauf

[57] ABSTRACT

A loop-style continuous ion exchange unit having a liquid treating section, a material weighing and transfer section, a regeneration section, a washing section and a back-washing section, all of which are connected together in a closed loop. The back-washing section is above the liquid treating section to enable material to fall by gravity into the liquid treating section. The liquid treating section is located above the material weighing and transfer section so that material can fall by gravity into the material weighing and transfer section. The washing area has an outlet located above the back-washing area so that washed material may flow by gravity to the back-washing area. Further, an expansion space is provided above the washing area to compensate for expansion of the material when it is washed.

9 Claims, 2 Drawing Figures

LOOP-STYLE CONTINUOUS ION EXCHANGE UNIT

BACKGROUND OF THE INVENTION

The present invention relates to a modified loop-style continuous ion exchange unit.

The continuous operation of ion exchange reaction units having moving beds has been conventionally accomplished according to so-called Higgins' system. This prior art Higgins' system has been originally utilized for extracting specific ingredients, but a modification thereof has recently been applied to the production of pure water and to the treatment of waste water.

However, the conventional loop-style continuous ion exchange unit utilized for these purposes has various defects such as instability of resin transfer and nonuniform resin transfer. These disadvantages will be described in greater detail later.

The object of the present invention is to provide a loop-style continuous ion exchange unit which does not exhibit the above disadvantages of the prior art units.

SUMMARY OF THE INVENTION

In accordance with the present invention, a loop-style continuous ion exchange unit comprises a liquid treating section, a back-washing section coupled to and located above the liquid treating section, a material weighing and transfer section coupled to and located below the liquid treating section and a regeneration section coupled to an outlet of the material weighing and transfer section. Regenerated material from the regeneration section is fed to a washing section for washing the regenerated material, the washing section having a portion thereof located at a higher level than the level of the back-washing section. Means is provided for coupling the higher upper level portion of the washing section to the back-washing area such that material from the washing section may be fed to the backwashing area under the influence of gravity. In accordance with the present invention, material from the back-washing area is fed to the treating area under the influence of gravity, and used material from the liquid treating area is fed to the weighing and transfer area also under the force of gravity. This arrangement permits ion exchange material to be transferred stably and smoothly throughout the loop. Excellent operating efficiencies are obtained.

In accordance with a further feature of the invention, an additional space is provided at the upper portion of the washing area so that expanded material can escape upwardly. This is a counter-measure for material expansion which may occur in the washing area.

DETAILED DESCRIPTION

Figure 1:
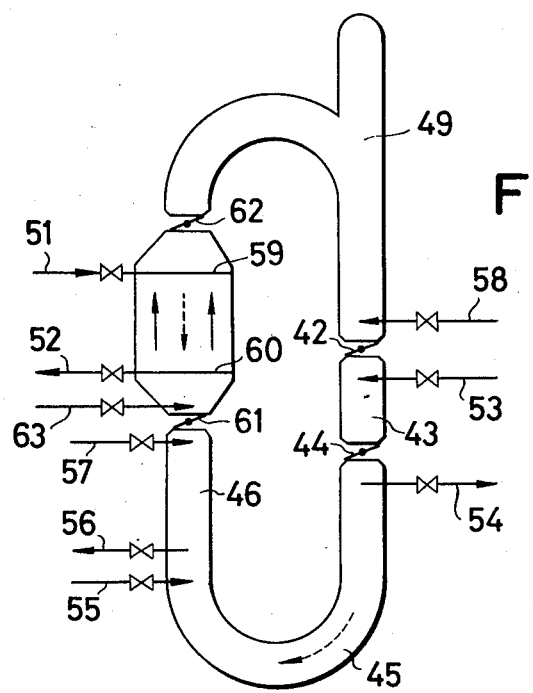
FIG. 1 shows a cross-sectional view of the prior art loop-style continuous ion exchange unit.

Referring to FIG. 1, a prior art loop-style continuous ion exchange unit operates as follows. A given amount of resin is put in a resin weighing and transferring area (pulse chamber) 43. This is done by opening valve 42 to feed resin from back-washing area 49 to pulse chamber 43. When the resin has reached the uppermost part of the pulse chamber, a sonic sensor in the pulse chamber 43 detects the resin and operates to shut valve 42. This completes the operation of feeding in the resin.

At pulse time, the following procedure is carried out in order to facilitate transfer of the resin in the loop. The loop valves 44, 61 and 62 are opened and water flows from pipe 63 to raise the resin in the contacter 41. Pipe 53 is opened to send in water after the lapse of a certain time. Pipe 53 is shut when resin has fallen to the lowest part of the sonic sensor to adjust the stroke, thus completing the resin transfer. As usual, in order to protect the system if the sonic sensor is not in good order, a pulse timer is set and when a predetermined time has passed, resin transfer can be completed by shutting pipe 53 even if the resin layer has not fallen to the lowest part of the pulse room as should be detected by the sonic sensor.

As mentioned above, in the conventional loop-style continuous ion exchange unit, resin transfer (i.e., pulse stroke) is accomplished by putting a certain amount of resin in pulse chamber 43 and transferring it with a hydraulic pressure. In such method, resin transfer is very unstable as it is done against gravity. In the conventional technique, as the resin hardness (i.e., packing rate of resin) at loop area 45 is not fixed, a different transfer speed is observed even when the hydraulic pressure is equal throughout the loop. When the loop area is very hard, the pulse timer comes to the end of its timing period before the resin has been transferred to the lowest part of the sonic sensor, thus causing a shortage of strokes. On the other hand, when the loop area is very soft, the transfer speed becomes too rapid, and transfer is advanced while sonic sensor operates to shut.

In resin transferring, resin in the central part of the loop is more easily transferred than that in other parts. Accordingly, resin transfer cannot be done uniformly. For example, only a part is easy to be flowed concentrically when the packing rate of the resin is high. In addition, as the pipe curves near the part for infusing chemical substances in the regeneration area, the infused substance may have its flow deflected. A whirled flow occurs in pulse chamber 43 at some times and causes a soaring phenomenon of the resin. As a result, the resin weighing unit operates incorrectly and the amount of transferred resin becomes unstable.

As mentioned hereinabove, the object of the present invention is to provide a loop-style continuous ion exchange unit in which these disadvantages are overcome.

Figure 2:
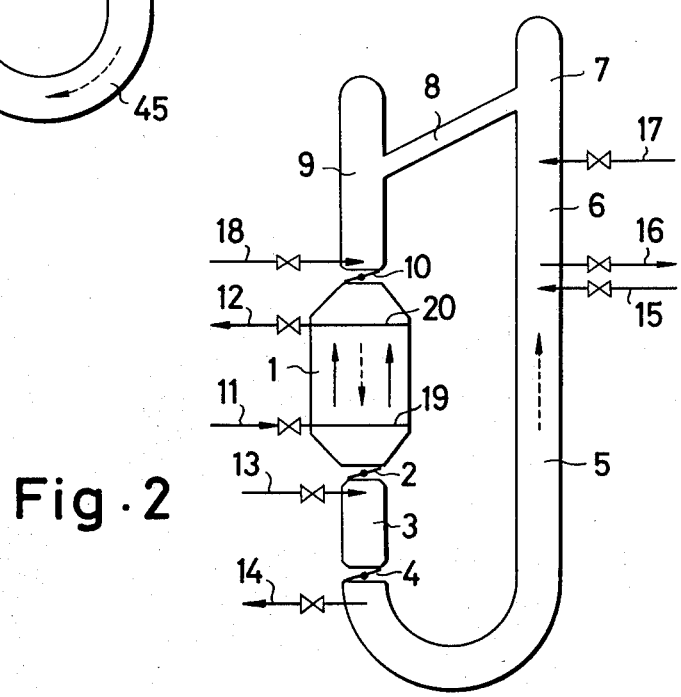
FIG. 2 shows a cross-sectional view of a loop-style continuous ion exchange unit according to the present invention.

The unit of the present invention will now be described with reference to FIG. 2. Raw water or influent is sent into the lower part of the raw water treating area 1 through pipe 11 and distributor 19 and sent out as treated water from collector 20 and pipe 12 after being contacted with ion exchange resin in a counter-current manner. A resin in raw water treating area 1 is introduced into the resin weighing and transferring area (i.e., pulse chamber) 3 under the influence of gravity by opening butterfly valve 2. Resin is sent into regeneration area 5 through valve 4 by sending a pulse of water from pipe 13, and resin is contacted there with a chemical substance (for instance, HCl) sent from pipe 15 for regeneration. The used or spent chemical substance is removed through pipe 14. Then, the regenerated resin is transferred to a washing area 6 to be washed with water fed in through pipe 17. Water used for washing is removed by pipe 16.

Resin expands by washing, and as a counter measure for such expansion, an additional space 7 is provided at the upper portion of washing area 6. Washed resin is sent under the influence of gravity acting on its own weight or with a hydraulic pressure to a backwashing area 9 through pipe 8. In this back-washing area 9, resin is back-washed with back-washing water sent from pipe 18, and after that it is introduced into the aforementioned raw water treating area 1 through valve 10. By setting an apparatus for weighing, for instance a sonic sensor, in pulse chamber 1, a certain amount of resin can be detected and opening, shutting, etc., of valve 4 and other valves can be adjusted automatically together with a timer. A supply of ion exchange resin can be fed into pulse chamber 1 with an ejector (not shown).

In the present invention, the exchange resin is naturally dropped by means of gravity in a part of the system. That is, resin in raw water treating area 1 is naturally dropped by gravity into pulse chamber 3 by opening valve 2. Therefore deflection of resin flow is decreased. In other parts of the system, resin is transferred by means of a pulse of hydraulic pressure. By providing the pulse chamber 3 below the raw water treating area 1 and minimizing the number of valves, the frequency of troubles such as those seen in conventional units which have many valves and cause deflection of resin flow due to an alteration in column diameter, can be remarkably reduced. In addition, as the feeding-in of chemical substances for regenerating resin is done in a straight pipe part of the system, regeneration treatment can be done effectively. Still further, as a counter measure for resin expansion in the washing area 6, an additional space 7 is provided at upper portion of the washing area 6 so that expanded resin can escape upward. Resin can also be advantageously transferred to the backwashing area 9 through a pipe 8 under the influence of gravity acting on its own weight or with a hydraulic pressure.

According to the unit of the present invention, transfer of ion exchange resin in loop can be accomplished stably and procedures such as back-washing, water circulation, regeneration and washing can be advanced very smoothly. Therefore, the treatment of industrial water or waste water with the unit of the present invention produces treated water with high purity. The unit of the present invention exhibits excellent efficiency in manufacturing pure water or drinking water continuously or in treating various kinds of waste water by ion exchange reaction.

We claim:
1. A loop-style continuous ion exchange apparatus, comprising:
   a liquid treating section (1) including an inlet and outlet for a liquid;
   first valve means (10) including only a single valve;
   a back-washing section (9) including a back washing fluid inlet and a material receiving inlet for receiving material to be washed, said back-washing section (9) being coupled to said liquid treating section (1) via said first valve means (10) and located above said liquid treating section (1) such that material from said back-washing section (9) is fed to said liquid treating section (1) from said back-washing section (9) via said first valve means (10) under the influence of gravity;
   second valve means (2) including only a single valve;
   a material weighing and transfer section (3) coupled to said liquid treating section (1) via said second valve means (2) and located below said liquid treating section (1) such that used material from said liquid treating section (1) is fed to said material weighing and transfer section (3) from said liquid treating section (1) via said second valve means (2) under the influence of gravity;
   third valve means (4) including only a single valve;
   a regeneration section (5) coupled to said material weighing and transfer section (3) via said third valve means (4) for receiving said used material therefrom and including means for regenerating said used material;
   a washing section (6) including an inlet and outlet for washing fluid, said washing section being coupled to said regeneration section (5) for washing regenerated material received from said regeneration section (5), the upper part of said washing section (6) being located at a higher level than said material receiving inlet of said back-washing section (9); and
   inclined conduit means (8) coupling said upper part of said washing section (6) to said material receiving inlet of said back-washing section (9), said conduit means (8) being downwardly inclined from said upper part of said washing section (6) to said material receiving inlet of said back-washing section (9) to feed washed material from said washing section (6) to said back-washing section (9) under the influence of gravity.

2. A loop-style continuous ion exchange apparatus according to claim 1 wherein said liquid treating section (1) comprises a raw water treating section and said inlet for said liquid is an inlet for raw water.

3. A loop-style continuous ion exchange apparatus according to claim 2 wherein said material comprises a resin for treating the raw material.

4. A loop-style continuous ion exchange apparatus according to claim 1 wherein said material comprises a resin.

5. A loop-style continuous ion exchange apparatus according to claim 1 further comprising means defining an expansion space (7) in the uppermost portion of said washing section (6).

6. A loop-style continuous ion exchange apparatus according to claim 5 wherein said means defining an expansion space (7) is a rectilinear extension of said washing section (6).

7. A loop-style continuous ion exchange apparatus according to claim 1 wherein said inclined conduit means (8) comprises a substantially straight, downwardly inclined pipe.

8. A loop-style continuous ion exchange apparatus according to claim 1 wherein said regeneration section (5) includes at least a portion located below said material weighing and transfer section (3).

9. A loop-style continuous ion exchange apparatus according to claim 1 wherein said valves of said first, second and third valve means each comprises a butterfly valve.

* * * * *